(12) United States Patent
Steiner et al.

(10) Patent No.: US 9,576,070 B2
(45) Date of Patent: Feb. 21, 2017

(54) CREATION AND DELIVERY OF PRE-RENDERED WEB PAGES FOR ACCELERATED BROWSING

(71) Applicant: Akamai Technologies, Inc., Cambridge, MA (US)

(72) Inventors: Moritz M. Steiner, San Francisco, CA (US); Martin T. Flack, San Francisco, CA (US); Stephen L. Ludin, Mill Valley, CA (US); Ketan Bhardwaj, Atlanta, GA (US)

(73) Assignee: Akamai Technologies, Inc., Cambridge, MA (US)

( * ) Notice: Subject to any disclaimer, the term of this patent is extended or adjusted under 35 U.S.C. 154(b) by 151 days.

(21) Appl. No.: 14/692,737

(22) Filed: Apr. 21, 2015

(65) Prior Publication Data

US 2015/0310126 A1 Oct. 29, 2015

Related U.S. Application Data

(60) Provisional application No. 61/983,367, filed on Apr. 23, 2014, provisional application No. 62/047,535, (Continued)

(51) Int. Cl.
*G06F 17/00* (2006.01)
*G06F 17/30* (2006.01)
(Continued)

(52) U.S. Cl.
CPC ..... *G06F 17/30905* (2013.01); *G06F 17/2247* (2013.01); *G06F 17/30887* (2013.01); *G06F 17/30896* (2013.01); *H04L 67/02* (2013.01)

(58) Field of Classification Search
CPC .................................... G06F 17/2247
See application file for complete search history.

(56) References Cited

U.S. PATENT DOCUMENTS 5,572,643 A 11/1996 Judson
5,737,619 A 4/1998 Judson
(Continued)

OTHER PUBLICATIONS

Twitter Blogs, Improving performance on twitter.com, available at https://blog.twitter.com/2012/improvingperformanceontwittercom, 6 pages, May 29, 2012 (downloaded Apr. 5, 2016).
(Continued)

*Primary Examiner* — Keith Bloomquist

(57) ABSTRACT

The process of rendering web pages can be significantly improved with a content delivery system that pre-renders web content for a client device. A web page "program" can be pre-executed and the result delivered to a requesting client device, rather than or before sending a traditional set of web page components, such as a markup language document, cascading style sheets, embedded objects. This pre-execution can relieve the client device of the burden of rendering the web page, saving resources and decreasing latency before the web page is ready, and can reduce the number of network requests that the client device must make before being able to display the page. Disclosed herein are methods, systems, and devices for creating and delivering pre-rendered web pages for accelerated browsing.

14 Claims, 8 Drawing Sheets

Related U.S. Application Data filed on Sep. 8, 2014, provisional application No. 62/054,305, filed on Sep. 23, 2014.

(51) Int. Cl.
*H04L 29/08* (2006.01)
*G06F 17/22* (2006.01)

(56) References Cited

U.S. PATENT DOCUMENTS

| | | | |
|---|---|---|---|
| 6,108,703 | A | 8/2000 | Leighton et al. |
| 6,243,761 | B1 | 6/2001 | Mogul |
| 6,820,133 | B1 | 11/2004 | Grove et al. |
| 7,200,681 | B1 | 4/2007 | Lewin et al. |
| 7,240,100 | B1 | 7/2007 | Wein et al. |
| 7,274,658 | B2 | 9/2007 | Bornstein et al. |
| 7,343,396 | B2 | 3/2008 | Kausik et al. |
| 7,376,716 | B2 | 5/2008 | Dilley et al. |
| 7,467,233 | B2 | 12/2008 | Tsimelzon et al. |
| 7,472,178 | B2 | 12/2008 | Lisiecki et al. |
| 7,596,619 | B2 | 9/2009 | Leighton et al. |
| 7,607,062 | B2 | 10/2009 | Grove et al. |
| 7,660,296 | B2 | 2/2010 | Fletcher et al. |
| 7,734,823 | B2 | 6/2010 | Tsimelzon et al. |
| 7,752,258 | B2 | 7/2010 | Lewin et al. |
| 8,166,079 | B2 | 4/2012 | Lewin et al. |
| 8,572,132 | B2 | 10/2013 | Lewin et al. |
| 8,856,263 | B2 | 10/2014 | Fainberg et al. |
| 8,972,461 | B2 | 3/2015 | Lewin et al. |
| 9,053,154 | B1* | 6/2015 | Shah ............... G06F 17/3053 |
| 9,262,396 | B1* | 2/2016 | Rodriguez Valadez ............. G06F 11/3684 |
| 2004/0064836 | A1* | 4/2004 | Ludvig ............. H04N 7/17336 725/95 |
| 2005/0177597 | A1* | 8/2005 | Elmer ............... G06F 17/30899 |
| 2008/0222273 | A1* | 9/2008 | Lakshmanan ..... G06F 17/30247 709/219 |
| 2009/0158140 | A1 | 6/2009 | Bauchot |
| 2010/0080411 | A1 | 4/2010 | Deliyannis |
| 2010/0211893 | A1* | 8/2010 | Fanning ............. G06F 17/3089 715/760 |
| 2010/0332993 | A1 | 12/2010 | Bousseton |
| 2011/0064383 | A1 | 3/2011 | Bauchot |
| 2011/0087953 | A1* | 4/2011 | Grohs ................ G06F 17/3089 715/205 |
| 2011/0142344 | A1* | 6/2011 | Fukushima ........ G06K 9/00979 382/182 |
| 2011/0314091 | A1 | 12/2011 | Podjarny |
| 2012/0051634 | A1* | 3/2012 | Chong ............... G06F 17/3025 382/165 |
| 2012/0284597 | A1 | 11/2012 | Burkard et al. |
| 2013/0006897 | A1 | 1/2013 | Jain et al. |
| 2013/0073509 | A1 | 3/2013 | Burkard et al. |
| 2013/0091417 | A1* | 4/2013 | Cordasco .......... G06F 17/30902 715/234 |
| 2013/0219024 | A1 | 8/2013 | Flack |
| 2013/0291102 | A1* | 10/2013 | Deyo ................. H04L 63/1441 726/22 |
| 2014/0105491 | A1* | 4/2014 | Hayek ................ G06K 9/6202 382/165 |
| 2014/0149844 | A1 | 5/2014 | Podjarny |
| 2014/0325346 | A1* | 10/2014 | Liu .......................... H04W 4/18 715/238 |
| 2014/0372511 | A1 | 12/2014 | Kudallur et al. |
| 2015/0088968 | A1 | 3/2015 | Wei et al. |
| 2015/0089352 | A1 | 3/2015 | Conboy et al. |

OTHER PUBLICATIONS

Opera Mini From Wikipedia, archive dated Feb. 21, 2011, 12 pages. https://en.wikipedia.org/w/index.php?title=Opera_Mini&oldid=415213585 (downloaded Apr. 14, 2016).

Opera Mini From Wkipedia, downloaded Apr. 14, 2016, 12 pages, available at https://en.wikipedia.org/wiki/Opera_Mini.

Opera Mini, Feb. 2012, archive dated Feb. 21, 2012, 12 pages. https://en.wikipedia.org/w/index.php?title=Opera_Mini&oldid=478041586 #cite_ref-39 (downloaded Apr. 14, 2016).

Kukic, Adnan, "AngularJS SEO with Prerender.io", web page published Jan. 28, 2014 available at https://scotch.io/tutorials/angularjsseowithprerenderio,10 pages (downloaded Apr. 5, 2016), Jan. 28, 2014.

Mills, Chris, "JavaScript support in Opera Mini 4, published Oct. 25, 2007, 3 pages. https://maqentaer.github.io/devopera-static-backup/http/dev.opera.com/articles/view/javascript-support-in-opera-mini-4/index.html", (downloaded Apr. 15, 2016).

Wayback Machine Web Archive, archive of web page 'Headless Testing', http://phantomjs.org/headlesstesting.html, dated Apr. 6, 2014, 2 pages (downloaded Apr. 5, 2016 from http://web.archive.org/web/20140406170702/http://phantomjs.org/headlesstesting.html).

Wayback Machine Web Archive, web page archive of Apr. 10, 2014 for 'Screen Capture' page, http://phantomjs.org/screen-capture.html, 3 pages (downloaded Apr. 5, 2016 from http://web.archive.org/web/20140410113910/http://phantomjs.org/screencapture.html).

Wayback Machine Web Archive, web page archive of Apr. 18, 2014 for 'Page Automation' page, http://phantomjs.org/page-automation.html, 2 pages (downloaded Apr. 5, 2016 from http://web.archive.org/web/20140418102623/http://phantomjs.org/pageautomation.html).

Wilcox, M., "Dev.Opera—Responsive Images: What's the Problem, and How Do We Fix it? Https://dev.opera.com/articles/responsive-images-problem, published on Jun. 13, 2012, Copyright 2006, 2015 Opera Software ASA, downloaded on Oct. 5, 2015, 13 pages."

Thyssen, A., ImageMagick v6 Examples—Image Comparing, last updated Apr. 2012, created Jun. 2005, 31 pages, available at http://www.imagemagick.org/Usage/compare/. (downloaded date in header Apr. 17, 2015).

WayBackMachine, 'ImageMagick Composite Command-Line Tool' web page, published Mar. 28, 2014 according to Wayback Machine, 4 pages. Available at Internet Archive Wayback Machine Web site, original URL http://imagemagick.org/script/composite.php.

WayBackMachine, 'ImageMagick Convert Command-Line Tool', published Mar. 28, 2014 according to Wayback Machine, 9 pages. Available at Internet Archive Wayback Machine Web site, original URL: http://imagemagick.org/script.convert.php.

WayBackMachine, ImageMagick: 'Convert, Edit or Compose Bitmap Images' web page, published Apr. 21, 2014 according to Wayback Machine, 3 pages. Available at Internet Archive WaybackMachine Web site, original URL: http://imagemagick.org (download date in header Apr. 17, 2015).

WayBackMachine, Internet Archive Frequently Asked Questions, published Apr. 17, 2014 according to Wayback Machine, 3 pages. Available at Internet Archive WaybackMachine Web site, original URL: http://archive.org/about/facqs.php (download date in header Apr. 7, 2015).

WayBackMachine, Command-Line Options, published Apr. 21, 2014 according to Wayback Machine, 4 pages. Available at Internet Archive WaybackMachine Web site, original URL: http://archive.org/script/command-line-options.php.

Baldauf, T., 'Performance Calendar, Little RGB Riding Hood: a JPEG's Tale' web page blog, posted Dec. 17, 2014, 8 pages. Available at http://calendar.perfplanet.com/2014/little-rgb-riding-hood-a-jpegs-tale/ (downloaded date in header Apr. 22, 2015).

Sullivan, G. et al., The H.264/AVC Advanced Video Coding Standard: Overview and Introduction to the Fidelity Range Extensions, SPIE Conference on Applications of Digital Image Processing, Aug. 2004, 22 pages.

Wikipedia, 'Motion compensation', published Mar. 29, 2014 according to Wikipedia, 6 pages. Also available at: http://en.wikipedia.org/w/index.php?title=Motion_compensation&oldid=601882469 (downloaded date in header Apr. 17, 2015).

Instart Logic, Inc., True Fidelity Image Streaming, Cloud Application Delivery service, page undated, downloaded Jul. 2014, 3 pages. http://instartlogic.com/platform/streaming/image-streaming/.

(56) References Cited

OTHER PUBLICATIONS

Instart Logic, Inc., What's the Difference Between a Web Application Streaming Network and a CDN?, posted Aug. 6, 2013, 3 pages. (downloaded date in header Jul. 14, 2014) http://www.instartlogic.com/blog/what-is-the-difference-between-a-web-application-streaming-network-and-a-content-delivery-network-cdn/#.U8Q-0fldWSp.

Wikipedia, H.264/MPEG-4 AVC, page version published as of Apr. 17, 2014, 14 pages. (downloaded date in header Apr. 17, 2015).

Park, K., et al., Codns: Improving DNS Performance and Reliability via Cooperative Lookups. In Proceedings of the 6th Conference on Symposium on Operating Systems Design & Implementation—vol. 6 (Berkeley, CA, USA, 2004), OSDI'04, USENIX Association, pp. 199-214.

Qian, F., et. al., Characterizing resource usage for mobile web browsing. In Proceedings of the 12th Annual International Conference on Mobile Systems, Applications, and Services (New York, NY, USA, 2014), MobiSys '14, Presented Jun. 16-19, 2014, ACM.

Hao Shang and Craig E. Wills. Piggybacking related names to improve DNS performance. Computer Networks, 50:1733-1748, Aug. 2006, at http://web.cs.wpi.edu/~cew/papers/comnet06.pdf.

Wang et al., Demystifying Page Load Performance with WProf, In Proceeding of10th USENIX Symposium on Networked Systems Design and Implementation (NSDI '13), Usenix Assoc. pp. 473-486 (2013).

Akamai Blog, "Speed up time to first byte with EdgeStart blog," with video, 5 pages, published Dec. 7, 2013, available at https://blogs.akamai.com/2013/12/speed-up-time-to-first-byte-with-edgestart.html.

Transcript of video at "Akamai Blog, Speed up time to first byte with EdgeStart blog" (https://blogs.akamai.com/2013/12/speed-up-time-to-first-byte-with-edgestart.html), given by Guy Podjarny, Dec. 7, 2013.

Instart Logic, Inc., True Fidelity Image Streaming, Cloud Application Delivery service, dated Jun. 20, 2014 according to Wayback Machine, 3 pages. https://web.archive.org/web/20140620023105/http://instartlogic.com/platform/streaming/imagestreaming/ (Wayback Machine archive page downloaded date in header Jun. 17, 2015).

Html2canvas 0.4.1, released Jul. 2013, available at http://html2canvas.hertzen.com>, Copyright (c) 2012 and 2013 Niklas von Hertzen, 63 pages, MIT License appended at front.

Zhou Wang et al., Image Quality Assessment: From Error Visibility to Structual Similarity, IEEE Transactions on Image Processing, vol. 13, No. 4, Apr. 2004, at http://www.cns.nyu.edu/pub/eero/wang03-reprint.pdf.

Zhou Wang, Alan Bovik, Mean Squared Error: Love It or Leave It?, IEE Signal Processing Magazine, Jan. 2009, at https://ece.uwaterloo.ca/~z70wang/publications/SPM09.pdf.

Zhou Wang and XinliShang, Spatial Pooling Stategies for Peceptual Image Quality Assessment, IEEE Inter. Conf/Image Proc. Atlanta, GA, Oct. 8-11, 2006, at https://ece.uwaterloo.ca/~z70wang/publications/icip06.pdf.

IDS Transmittal Letter submitted with this SB/08 form, Aug. 30, 2015.

Tenox, 'Surfing Modern Web With Ancient Browsers, Fun with Virtualization', posted Mar. 3, 2014 , 21 pages, http://virtuallyfun.superglobalmegacorp.com/?p=3866 (download date in header Jul. 14, 2014).

Tenox, Web Rendering Proxy, Fun with virtualization, web page, posted Mar. 11, 2014, 17 pages, http://virtuallyfun.superglobalmegacorp.com/?p=3910

Wayback Machine archive of http://www.tenox.net/out/, archived date of Apr. 8, 2014, https://web.archive.org/web/20140408004233/http://www.tenox.net/out/ , with links to wrp11-cocoa.py and wrp11-qt.py (archive downloaded Jun. 17, 2015).

Web Rendering Proxy script WRP, A. Sawicki, available at http://www.tenox.net/out/wrp11-qt.py, version 1.1, copyright 2013-2014 (page downloaded Jun. 17, 2015).

Web Rendering Proxy script WRP, A. Sawicki, available at http://www.tenox.net/out/wrp11-cocoa.py, version 1.1, copyright 2013-2014 (page downloaded Jun. 17, 2015).

Wayback Machine Archive of Tenox, 'Surfing Modern Web With Ancient Browsers, Fun with Virtualization', posted Mar. 3, 2014, 21 pages, http://virtuallyfun.superglobalmegacorp.com/?p=3866 (Wayback Machine archive date of Mar. 25 2014, available at https://web.archive.org/web/20140325080101/http://virtuallyfun.superglobalmegacorp.com/?p=3866).

Wayback Machine Archive of Tenox, Web Rendering Proxy, Fun with virtualization, web page, posted Mar. 11, 2014, 17 pages, http://virtuallyfun.superglobalmegacorp.com/?p=3910 (Wayback Machine archive date of Mar. 30, 2014, available at https://web.archive.org/web/20140330231832/http://virtuallyfun.superglobalmegacorp.com/?p=3910).

O'Callahan, R. et al., Well, I'm Back, Rendering Web Pages to Images, posted May 14, 2005, 7 pages. (header has download date of Jul. 24, 2014) http://robert.ocallahan.org/2005/05/rendering-web-page-to-images__13.html.

Wayback Machine archive of O'Callahan, R. et al., Well, I'm Back, Rendering Web Pages to Images, posted May 14, 2005, 7 pages. http://robert.ocallahan.org/2005/05/rendering-web-page-to-images__13.html (Wayback Machine archive date of Jul. 24, 2013, available at https://web.archive.org/web/20130724004718/http://robert.ocallahan.org/2005/05/rendering-web-page-to-images__13.html).

GitHub listing for tenox2/wrp-cocoa at v1.0, at https://github.com/tenox2/wrpcocoa/tree/v1.0, authored Jul. 13, 2014.

GitHub listing for tenox2/wrp-cocoa at v1.1, at https://github.com/tenox2/wrpcocoa/tree/v1.1, authored Jul. 13, 2014.

* cited by examiner

CREATION AND DELIVERY OF PRE-RENDERED WEB PAGES FOR ACCELERATED BROWSING

This application is based on and claims the benefit of priority of U.S. Application No. 61/983,367, filed Apr. 23, 2014, and of U.S. Application No. 62/047,535, filed Sep. 8, 2014, and of U.S. Application No. 62/054,305, filed Sep. 23, 2014, the contents of each of which are hereby incorporated by reference in their entireties.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to distributed data processing systems and to the delivery of content to users over computer networks.

Brief Description of the Related Art

Websites are the front-end to online businesses, software-as-a-service platforms, enterprise software, web applications, media and entertainment, and other platforms, products, and services. The speed at which web pages load is of critical importance to content providers. If a page takes too long to load, end-users will have a negative experience, and may abandon the site, product, and/or service. Moreover, end-users' tolerance for delays in web page loading is decreasing.

A variety of technologies have been developed to improve website speed and reliability, including distributed computer systems known as content delivery networks (CDNs) which are typically operated and managed by service provider on behalf of participating content providers, who designate content to be delivered to end-users over the CDN infrastructure. The CDN typically comprises a set of content servers distributed around the Internet, along with command and control, logging, security and other infrastructure to facilitate and enhance the delivery of content.

The speed at which a web page loads is affected by the time it takes to retrieve content, as well as the time it takes to render the content in a browser or other application executing on the client device. A web page is composed of many different components—such as embedded images, style sheets, multimedia, AJAX, and other objects—that are referenced in a markup language document describing the overall page presentation characteristics, such as an HTML document. Typically, a client application retrieves each of these components and then, per the presentation instructions in the markup language document (and dynamically fired AJAX instructions), creates the page. In a sense, the markup language and components represent a program that the client application executes to paint a web page on the screen for a user. Retrieving the components takes time and is dependent on such factors as client-server distances and server load. Executing the web page "program" to render the page takes time and is dependent on such factors as client device CPU speed, available memory, interface speed and other processing constraints. As page functionality and complexity increases, along with the popularity of processing-constrained mobile devices, the execution of the "program" becomes particularly problematic.

The teachings hereof address the need to improve web page loading time, user experience, and related needs. The teachings hereof present technical changes and improvements to the function, operation, and performance of individual computers and distributed computing systems, such as content delivery networks, to achieve such ends. The teachings also provide other benefits and improvements that will become apparent in view of this disclosure.

SUMMARY

The process of rendering web pages can be improved with a content delivery system that pre-renders web content for a client device. A web page "program" can be pre-executed and the result delivered to a requesting client device, rather than (or before) delivering a traditional set of web page components, such as a markup language document, cascading style sheets, and embedded objects. This can relieve the client device of the burden of rendering the web page, saving resources and decreasing latency before the web page is ready and also can reduce the number of network requests that the client device must make for the page. As noted, in some cases, a "traditional" load and render process for the web page's components might be performed following the loading of the pre-rendered version.

By way of example, in response to request for a given web page's HTML, a web server can send to a client an image of an already rendered page—or some portion thereof—for initial display to the user. User interface artifacts may be included to indicate to the user that the image is temporary. The image of the rendered page preferably represents a reasonable approximation of the actual page, so that the user can begin to view and read the website—and in some cases, even engage the page via clicks, touches, gestures or other user input. The images of the rendered pages are preferably obtained from actual page renderings on actual client devices—e.g., by harvesting a snapshot of the actual rendered page from client browsers who previously accessed the page, and/or farming a rendered version of the actual page from a set of browsers running in a cloud infrastructure. In some embodiments, the client devices that request a given page are instructed (e.g., via JavaScript) to create an image of the rendered page after it is delivered and send it back to the system (e.g., via HTTP POST). This kind of harvesting may be done for all client devices or a subset or sample of client devices where an image of the page being requested is not yet in the system, or is otherwise needed. The returned snapshot images can be processed to remove personal or sensitive content, and/or content that differs across page loads such as advertising banners. The system can thus be designed to work at scale, preferably, though without limitation, as part of a content delivery network.

As those skilled in the art will recognize, the foregoing description merely refers to examples for purposes of illustration of aspects of the disclosure. It is not limiting and the teachings hereof may be realized in a variety of systems, methods, apparatus, and non-transitory computer-readable media. Further examples can be found in the claims appended hereto, which are incorporated by reference here.

BRIEF DESCRIPTION OF THE DRAWINGS

The teachings hereof will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example." It should also be noted that the allocation of functions to particular machines is not limiting, as the functions recited herein may be combined or split amongst different machines in a variety of ways.

The description below refers to common web protocols and technologies, such as HTML, HTTP/S, JavaScript, URLs, and the like, basic familiarity with which is assumed. These protocols and technologies are examples used for illustrative purposes and are not meant to be limiting to the concepts disclosed.

Distributed Computing Systems and Content Delivery Networks

The methods, apparatus, and systems described herein are preferably though without limitation implemented in a distributed computing system of multiple servers servicing client requests and communicating with support machines to perform subsidiary functions, as described below (e.g., ingest of client-supplied web page snapshots, visual differencing, dissemination of images to content servers, etc.). The servers may be part a conventional shared delivery platform known as a content delivery network (CDN), modified by the teachings hereof.

One kind of CDN is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence.

Figure 1:
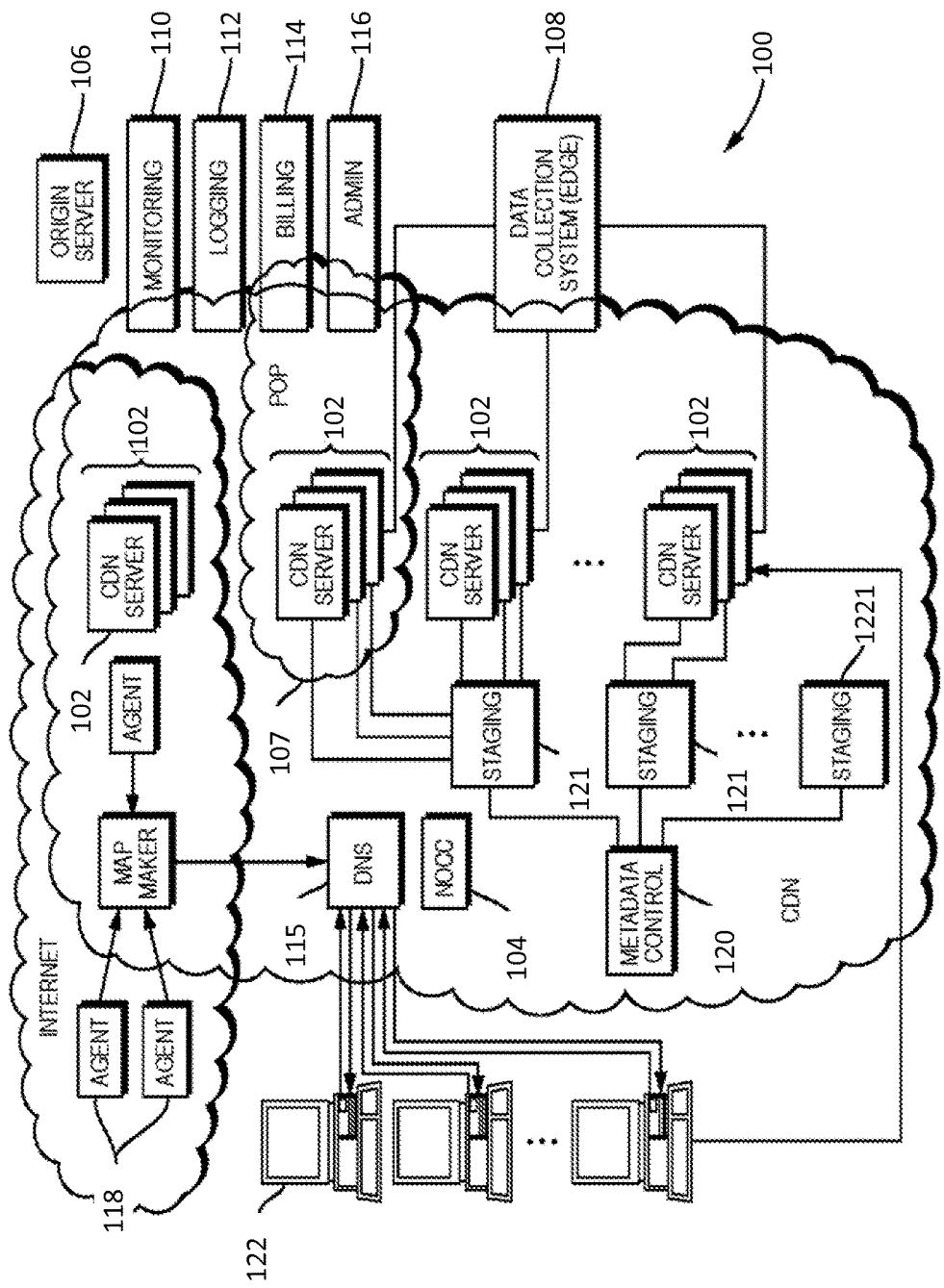
FIG. 1 is a schematic diagram illustrating one embodiment of a known distributed computer system configured as a content delivery network (CDN), which can be modified with the teachings hereof.

In a known system such as that shown in FIG. 1, a distributed computer system 100 is configured as a content delivery network (CDN) and has a set of content servers 102 distributed around the Internet. Typically, most of the servers are located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the content servers. Such servers may be grouped together into a point of presence (POP) 107 at a particular geographic location.

The content servers are typically located at nodes that are publicly-routable on the Internet, in end-user access networks, peering points, within or adjacent nodes that are located in mobile networks, in or adjacent enterprise-based private networks, or in any combination thereof.

In a typical operation, a content provider identifies a content provider domain or sub-domain that it desires to have served by the CDN. When a DNS query to the content provider domain or sub-domain is received at the content provider's domain name servers, those servers respond by returning the CDN hostname (e.g., via a canonical name, or CNAME, or other aliasing technique). That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the content server checks its configuration file to determine whether the content domain or sub-domain requested is actually being handled by the CDN. If so, the content server applies its content handling rules and directives for that domain or sub-domain as specified in the configuration. These content handling rules and directives may be located within an XML-based configuration file, as described later.

The content servers respond to the client requests, for example, by fetching requested content from a local cache, from another content server, from the origin server 106 associated with the content provider, or other source, and sending it to the requesting client. For cacheable content, content servers typically employ on a caching model that relies on setting a time-to-live (TTL) for each cacheable object. After it is fetched, the object may be stored locally at a given content server until the TTL expires, at which time is typically re-validated or refreshed from the origin server 106. For non-cacheable objects (sometimes referred to as 'dynamic' content), the content server typically returns to the origin server 106 when the object is requested by a client. The CDN may operate a server cache hierarchy to provide intermediate caching of customer content in various content servers that are between the content server handling a client request and the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115. A distributed data transport mechanism 120 may be used to distribute control information (e.g., control information to manage content, to facilitate load balancing, and the like) to the content servers 102. The CDN may include a network storage subsystem (sometimes referred to herein as "NetStorage") which may be located in a network datacenter accessible to the content servers and which may act as a source of content, such as described in U.S. Pat. No. 7,472,178, the disclosure of which is incorporated herein by reference.

Figure 2:
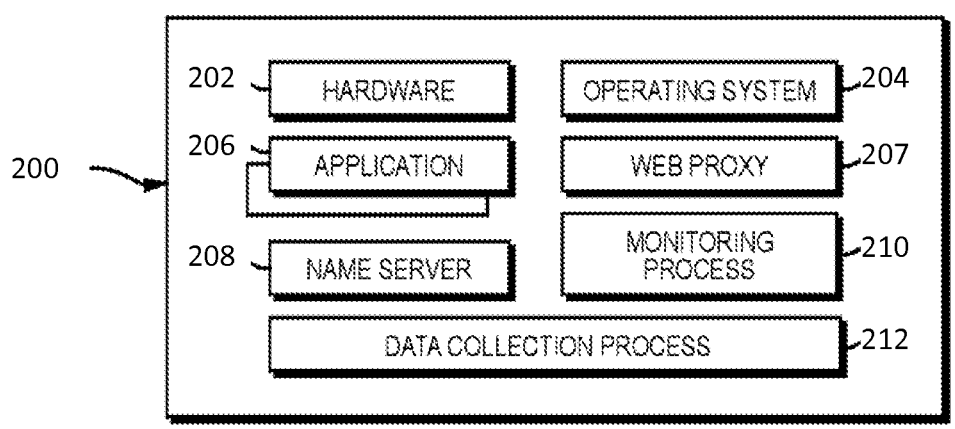
FIG. 2 is a schematic diagram illustrating one embodiment of a machine on which a CDN server in the system of FIG. 1 can be implemented.

As illustrated in FIG. 2, a given machine 200 in the CDN comprises commodity hardware (e.g., a microprocessor) 202 running an operating system kernel (such as Linux® or variant) 204 that supports one or more applications 206. To facilitate content delivery services, for example, given machines typically run a set of applications, such as an HTTP proxy 207, a name service 208, a local monitoring process 210, a distributed data collection process 212, and the like. The HTTP proxy 207 typically includes a manager process for managing a cache and delivery of content from the machine.

A given content server shown in FIG. 1 may be configured to provide one or more extended content delivery features, preferably on a domain-specific, content-provider-specific basis, preferably using configuration files that are distributed to the content servers using a configuration system. A given configuration file preferably is XML-based and includes a set of content handling rules and directives that facilitate one or more advanced content handling features. The configuration file may be delivered to the content server via the data transport mechanism. U.S. Pat. No. 7,240,100, the contents of which are hereby incorporated by reference, describe a useful infrastructure for delivering and managing content server content control information and this and other control information can be provisioned by the CDN service provider itself, or (via an extranet or the like) the content provider customer who operates the origin server. More information about a CDN platform can be found in U.S. Pat. Nos. 6,108,703 and 7,596,619, the teachings of which are hereby incorporated by reference in their entirety.

The CDN platform may be considered an overlay across the Internet on which communication efficiency can be improved. Improved communications on the overlay can help when a content server needs to obtain content from an origin server 306, or otherwise when accelerating non-cacheable content for a content provider customer. Communications between content servers and/or across the overlay may be enhanced or improved using improved route selection, protocol optimizations including TCP enhancements, persistent connection reuse and pooling, content & header compression and de-duplication, and other techniques such as those described in U.S. Pat. Nos. 6,820,133, 7,274,658, 7,607,062, and 7,660,296, among others, the disclosures of which are incorporated herein by reference.

As an overlay offering communication enhancements and acceleration, the content server resources may be used to facilitate wide area network (WAN) acceleration services between enterprise data centers and/or between branch-headquarter offices (which may be privately managed), as well as to/from third party software-as-a-service (SaaS) providers used by the enterprise users.

In this vein CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider).

With the foregoing by way of introduction, methods, apparatus, and systems for creating and delivering images of rendered web pages are now described.

Creation & Delivery of Images of Rendered Web Pages

To load a web page, a client device typically requests an HTML document at a given URL and receives the HTML document from a content server, such as server 102 in FIG. 1. The HTML contains references to embedded objects at other URLs, e.g., an <img> with a src attribute pointing to a URL. The client requests the embedded objects, and then renders the page (although rendering may begin before all objects are retrieved). In one embodiment of the teachings hereof, the foregoing approach can be modified to significant advantage by having the server return an image of a rendered page—or some portion thereof—for initial display to the user. User interface artifacts may be included to indicate to the user that the image is temporary. The image of the rendered page is preferably represents a reasonable approximation of the actual page, so that the user can begin to view and read the website—and in some cases, even engage the page via clicks, touches, gestures or other user input. The images of the rendered pages are preferably obtained from actual page renderings on actual client devices—e.g., by harvesting a processed version of the actual page from client browsers at large who are accessing the website, and/or farming a rendered version of the actual page from a set (or "farm") of browsers running in a cloud infrastructure. In some embodiments, the client devices that request a given page are instructed (e.g., via Javascript) to create an image of the rendered page after it is delivered and send it back to the system (e.g., via HTTP POST). This kind of harvesting may be done for all client devices or a subset or sample of client devices where an image of the page being requested is not yet in the system, or is otherwise needed.

Using actual screen renderings from a real browser as input to the system can provide a good representation of the eventual rendering of the particular browser in a given page load. The image of the rendered page may be any of kind of compressed or uncompressed image.

For convenience of description herein, the images of the rendered pages that are harvested from client devices are referred to interchangeably as harvested web page snapshots or web page screenshots, regardless of the manner in which they are captured. The images of rendered pages that are delivered to requesting client devices are sometimes referred to interchangeably as "processed" web page snapshots/ screenshots, or as cheat images, in this document and in the priority documents. For simplicity and convenience of description, the term "mirage image" will be used herein to refer to such "processed" web page snapshots/screenshots/cheat images. This is for convenience of description; no difference in meaning is intended. It should be understood that the mirage images may not differ significantly—in some cases minimally or not at all—from the harvested snapshots/screenshots. In other cases, due to the aggregation and de-sensitizing processes described below, there may be significant differences. Note that a mirage image may show all of a given rendered web page or a portion thereof. It should also be understood that harvested snapshots/screenshots may represent an entire rendered web page or a portion thereof.

The HTML of the actual page and its embedded components can be sent and loaded behind a mirage image. The term 'actual page' is intended to mean a page that does not rely on the mirage image and is constructed in the conventional way, e.g., as a result of the browser retrieving, parsing and applying various page components such as HTML, CSS, embedded objects, Javascript, and the like. When ready, the actual page can be switched in for the mirage image, and normal browsing can proceed. In some embodiments, user interaction (e.g., clicks, touches, gestures, swipes) with the mirage image are captured and replayed when the actual page is live.

In some embodiments, a mirage image may be accompanied with additional metadata to facilitate approximations of user-input constructs that the actual page would furnish, but in a more compact and less-capable manner. For example, if the actual page has a variety of events that it would recognize for clicks, touches, and gestures, a subset of those which are preferably relatively simple in capture (e.g. a click or touch) and outcome (e.g. resulting in immediate navigation to another URL without any Javascript execution), may be rationalized in metadata and transmitted along with the mirage image, e.g., as data or encoded as Javascript, such that when displaying the mirage image, the browser also furnishes some of the same user-interface functions and may act upon them immediately without requiring the actual page to load. Another type of element that might be analyzed and rationalized in such a manner is a pull-down menu; the mirage image may have a real pull-down menu overlaid and allow interaction, the choice of which is immediately visible to the user, with the resulting onchange event held for replay when the actual page is live. Alternatively, if the onchange event is linked to a Javascript function that navigates to another URL (e.g., this determination made by static source code analysis of the Javascript function itself, or by test execution or probing in an instrumented Javascript environment to check for installed handlers, or otherwise), this may fall below the threshold of complexity such that the system can transmit this information along with the mirage image.

In some cases, a cooperating client is leveraged to accomplish the functionality described herein. The term cooperating client is used to mean a browser or other client application that is programmed to be capable of implementing the described functionality, and which may interact with the server in ways described herein. Thus, in some cases, functionality described herein may be specifically custom-programmed into the browser (e.g., natively or with suitable extension, add-on, plugin, or the like), potentially in conjunction with modifications to the operating system and/or hardware of the client machine on which the browser runs. A client "browser" is used as a typical example; any client application may be used. The cooperating client can facilitate the mirage image approach in many ways. For example, a cooperating client might notify the server (e.g., via a notification in its HTTP request) that it can accept the mirage image and display it. The logic to load the actual page may be provided in the client itself. Further, as mentioned earlier, cooperating clients can be tasked to return page screenshots for processing by the server-side platform to develop appropriate mirage images.

Alternatively, in some embodiments, off-the-shelf, general-purpose browsers can provide the requisite abilities or the execution environment to achieve the functionality. For example, in some cases, the process of sending and using mirage images and associated data can be arranged so that a client browser can (1) send web page snapshots to the system for harvesting, and/or (2) consume the mirage images without custom programming—that is, using standardized and/or customary technologies built into most all modern browsers and therefore requiring no modifications specific to the features described herein. In many cases, desired logic can be provided in Javascript to be executed in the browser. For example, the mirage image can be contained in HTML that constructs a temporary page (sometimes referred to interchangeably as a 'splash' page) and that may—in addition to displaying the mirage image—contain or reference logic (e.g., in embedded scripts like Javascript) to load resources in the background and then to switch in the actual page defined by the actual HTML at the appropriate time.

The system may accept configuration in a variety of forms. Three examples are: (a) configuration saved into the system through a GUI or API, which configuration might be, for example, on a per-domain basis, per-URL basis, per content provider basis, per-CDN basis, per-CDN-product basis, or per-protocol basis such as a HTTP/1.x or HTTP/2; (b) metadata served from origin alongside or mixed into the HTTP response or HTML that carries configuration semantics for the system, and/or (c) the availability of special template pages from origin that contain information mixed into the HTTP response or HTML that guide the system.

Figure 3:
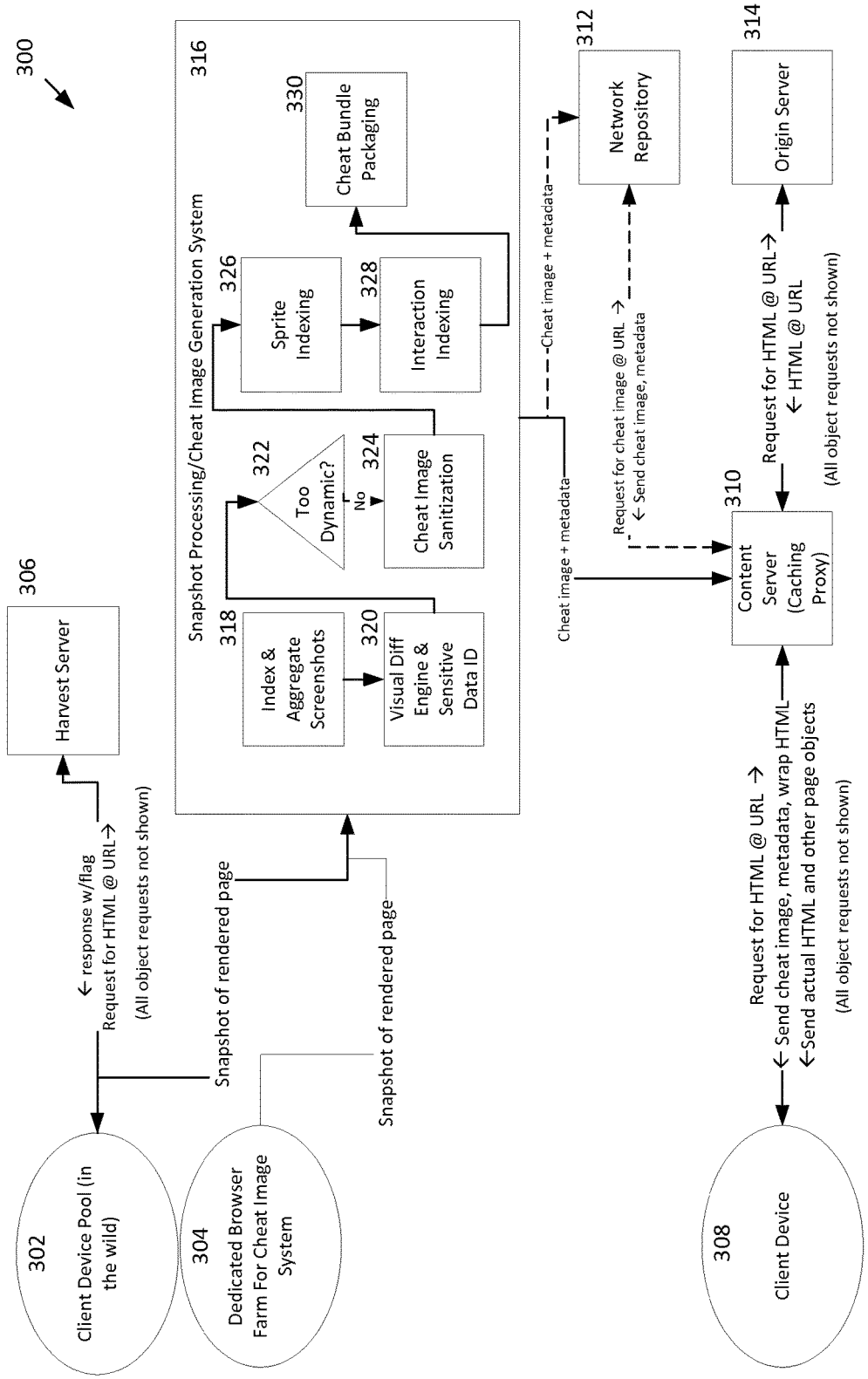
FIG. 3 is a schematic diagram illustrating an embodiment of a content delivery system that creates and delivers web page snapshots, in accordance with the teachings hereof.

FIG. 3 illustrates one embodiment of a system 300 at a high-level overview of the system, in accordance with the teachings hereof. While not limiting this and other system embodiments are preferably implemented as part of a content delivery network platform of the type described earlier.

In general, FIG. 3 depicts two aspects: a web page snapshot harvesting aspect, and a mirage image delivery aspect. The harvesting of web page snapshots occurs from client devices 302/304. Client devices 302/304 are typically conventional computers, including laptops, tablets, smartphones, running a web browser or other client application. The harvesting may occur from end-user client devices 302 (e.g., that are requesting the web page from the platform) or a pool of test client devices 304. In the former case, a harvest server 306 prompts client devices 302 to send back web page snapshots with a flag or other instructions. The sending of the snapshot typically occurs after the harvest or other server 306 delivers the actual page to the client device 302. Note that the harvest server 306 is preferably a content server in a CDN, such as a caching HTTP proxy server, and may be the same server 310 as is shown in FIG. 3. The processing subsystem 316 receives the web pages snapshots obtained from the client devices 302/304. A variety of processing steps may then occur to process web page snapshots, and these are described in more detail later.

The mirage image delivery aspect is generally represented by client device 308 interacting with the content server 310. A given client device 308 requests a given web page's HTML; assume that a mirage image is available for that web page. The content server 310 will respond with the mirage image and a HTML wrapper to enable the client browser to display it, and potentially includes other metadata and instructions to request the actual page components. On the back-end, the content server 310 obtains the mirage image form the processing subsystem 316, from a network repository run by the CDN, or the like. The content server 310 also obtains the actual page components from cache or the origin 314. The actual page components are delivered to the client device 302 so that the actual page can be displayed once ready, replacing the mirage image.

More detail on various steps in the process is now provided, with reference to FIG. 3.

Harvesting.

The harvesting process obtains images of rendered pages for ingest and use by the system 300. Preferably, clients 302/304 loading a given HTML document at a given URL send back a snapshot of the page at the browser onload event, or a similar point in the render cycle. Such clients may be cooperating browsers in the wild. Such browsers may be such as a a pool of browsers with end-user opt-in. Alternatively, the clients may be unmodified browsers. Such clients may alternatively be part of a farm running on a dedicated platform (e.g., browser instances running in an infrastructure) and used by the system to build the images.

The web page snapshots are preferably transmitted after the network activity on a client device 302/304 has dropped below a threshold, or they can be stored in the browser and sent back across the network at a subsequent time, if not too stale. For mobile devices, transmission might be delayed until WiFi availability (or LTE, or other connectivity that meets or could be expected to meet a minimum bandwidth threshold or reliability standard). A given web page snapshot is preferably of the viewport area of the browser, preferably without the window decoration such as operating system or window manager window. The snapshot may in some cases extend past the displayed area, e.g., two or three screen heights or window heights. In response to the client browser's request for a page, the client browser can receive from the harvest server 306 a special flag (e.g., in a header field) soliciting a screenshot from the server in the original HTTP response, and the client might not perform the step otherwise. This selective approach allows the server to utilize a blacklist/whitelist for clients, rules around page types to exclude, and the like. In this regard, the server 306 evaluates the requesting client 302 and determines whether to set the flag. The evaluation maybe based on any of a variety of factors, such as user agent and/or IP address evaluation to reach device identification, geography determination, network connection characteristics, or cookie information identifying the user or the type of user.

In an alternative to the HTTP flag, a client device 302/304 requests a given page HTML from the harvest server 306 and receives back the HTML for the page, into which the harvest server 306 has inserted instructions (e.g., Javascript) to cause the client device 302/304 to obtain the web page snapshot and return the web page snapshot by subsequent POST request. That is, the harvest server 306 fulfills the client's request for the given page, but inserts in the page such instructions. In this way, the origin server 314 does not need to modify its pages to work within the system. More details on this approach, including example JavaScript instructions, will be described with respect to FIG. 5.

In some embodiments, in addition to the web page snapshot, the client browser may send an image map of anchors (such as rectangles with URL href's) corresponding to the mirage image. Further, in addition to an image map, the client browser may send information about controls such as pull-down menus, input boxes, and buttons as well as outcomes instrumented to interact with those controls, including JavaScript, as described elsewhere herein. In an alternate implementation, the client browser may send certain key aspects of the HTML along with the web page snapshot, such as the <title> from the <head>, and the BGCOLOR or CSS BODY background-color.

In some embodiments, a client device uploading a web page snapshot for harvesting could compare it with a previously sent snapshot, and send only information specifying the differences between the current snapshot in the system and the snapshot it wants to communicate. The deduplication algorithm employed could be work on strings of bytes, like traditional compression that is known in the art, or it could be based on graphical techniques such as noticing when boxes of pixels are identical or have been slid around.

Indexing.

At 318, the processing subsystem 316 begins archiving and indexing the web page snapshots with metadata: e.g., width & height, provenance information such as browser type & version, OS type & version, etc. Because clients themselves have sent web page snapshots, the need for employing custom layout engines is mitigated.

Visual Diff. And Analysis of Dynamic Pixels and/or Sensitive Pixels

Figure 6A:
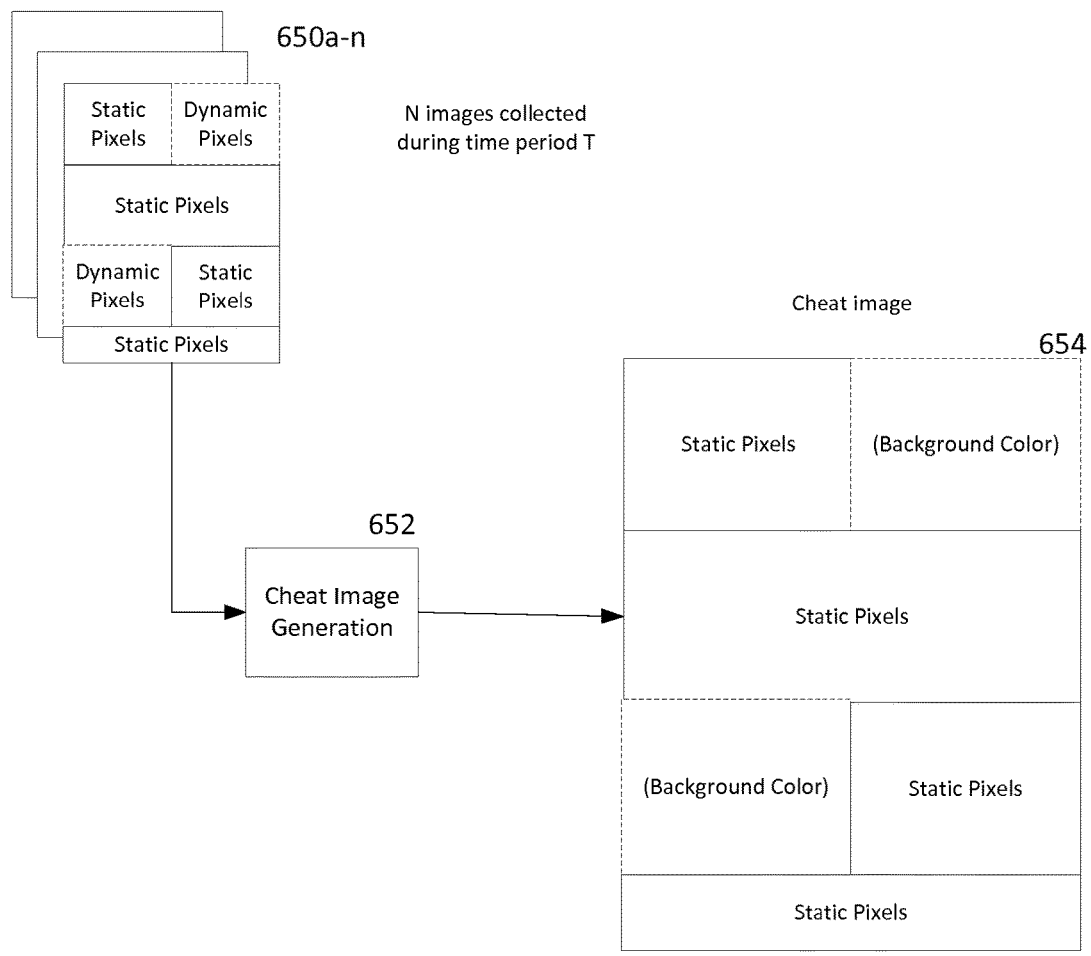
FIG. 6A is a schematic diagram illustrating an embodiment of visual differencing and creation of a web page snapshot, in accordance with the teachings hereof.
Figure 6B:
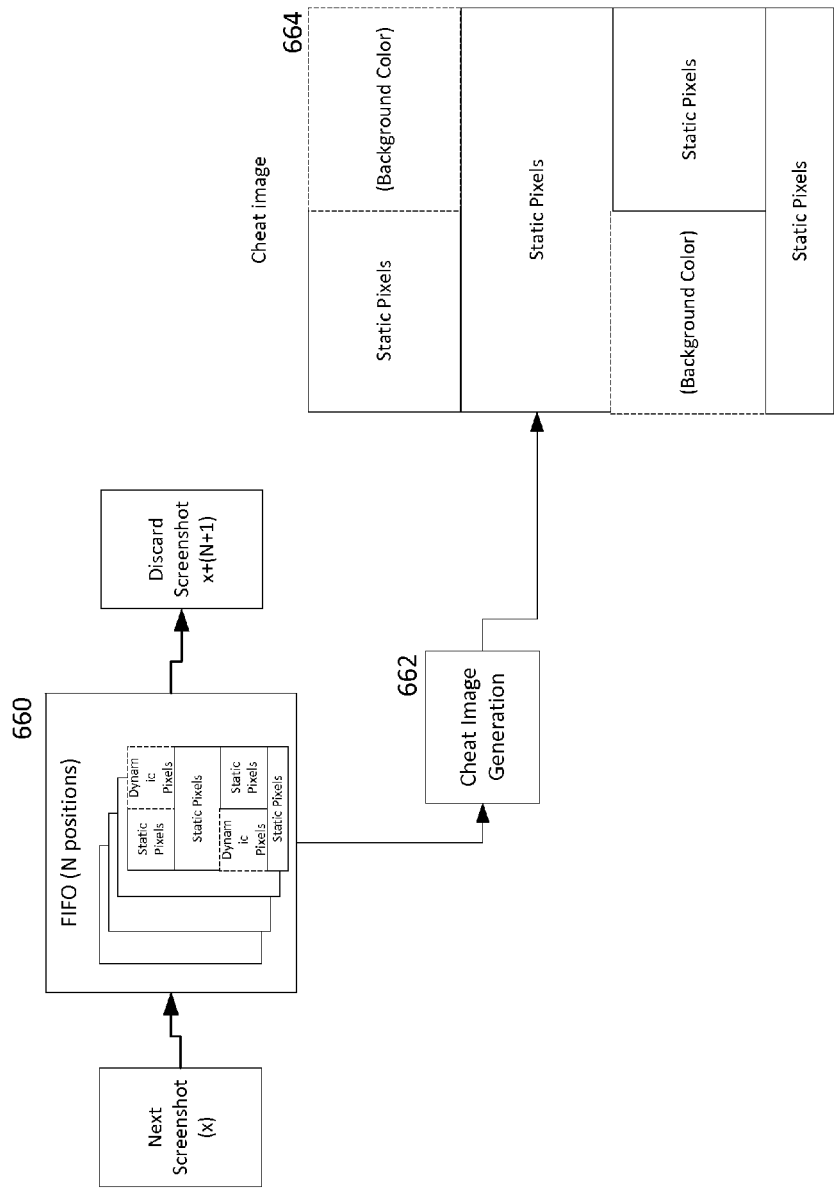
FIG. 6B is a schematic diagram illustrating an embodiment of visual differencing and creation of a web page snapshot, in accordance with the teachings hereof.
Figure 7:
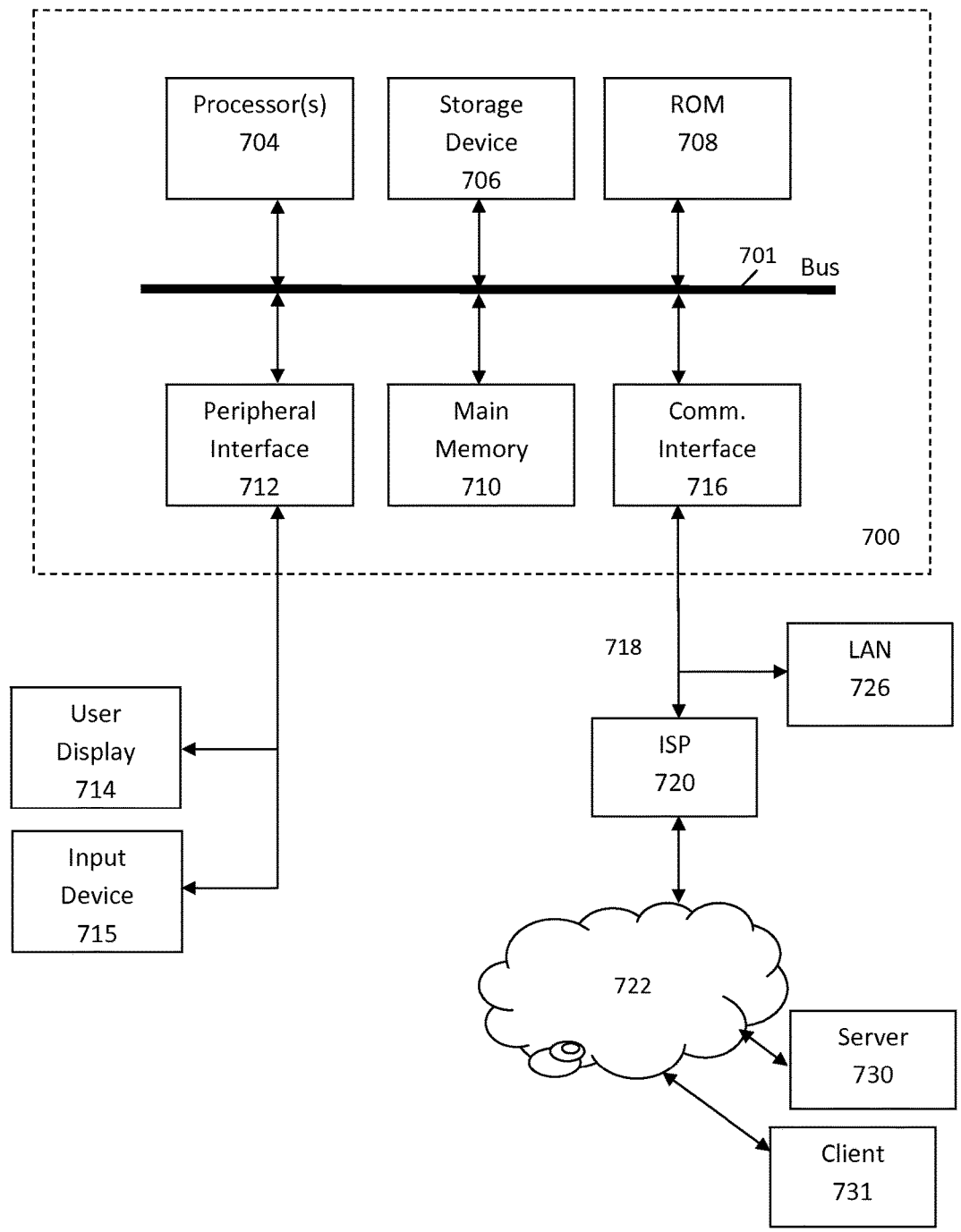
FIG. 7 is a block diagram illustrating hardware in a computer system that may be used to implement the teachings hereof.

At 320, once we have a threshold number (e.g., 100 or 1000) of web page snapshots per category (where category might be defined at any level of granularity; one example of a category definition is the combination of URL/client-browser-version/OS-version), the subsystem 316 analyzes the web page snapshots in the category graphically. This analysis is to identify pixels that are "dynamic" versus pixels that are identical across snapshots ("static"). (This step could be accomplished with a tool such as ImageMagick, part of a Linux distribution, or similar technology.) The results can be cached and used by the subsystem 316 for a given time period. It is possible that the threshold-defined set of analyzed snapshots is discarded at this point; alternatively, they can be kept and treated as a FIFO queue as new ones arrive, with the oldest being discarded one-for-one such that the visual differencing is always calculated from the most recent N web page snapshots, where N is the FIFO queue size. FIGS. 4A and 4B illustrate embodiments of visual differencing approaches. In FIG. 6A, N snapshot images 650*a-n* are collected during a given time period T. Each snapshot is depicted as having regions that are static and others that are dynamic for the given page. The snapshots are processed at 652 using the techniques described herein to identify and remove the dynamic pixels, creating a mirage image 652 that has the static pixels and a background color in place of the dynamic pixels. In FIG. 6B the snapshots are stored in a FIGO queue 660 such that the last N snapshots are in the queue and being taken in account in the processing. Mirage image processing 662 is applied to create the final mirage image 664, which again retains the static pixels and a background color in place of the dynamic pixels.

It should be noted that for processing the web page snapshots are preferably in the form of raster graphics, preferably uncompressed, to facilitate visual differencing and processing with pixel wise comparison, as well as avoid (preferably) artifacts or other degradation that may occur from working with lossy compression. PNG is one example format. Note that it is possible that a client might transmit a web page snapshot in another format and the subsystem 316 might perform a conversion. The foregoing are merely preferred embodiments, however, and not limitations; the teachings hereof are not limited to a particular format or to the use or non-use of compression.

Once the web page snapshots have been processed to create the mirage images in the final form that will be delivered to clients, they may remain as uncompressed images or be converted to a lossy compression such as GIF or JPG to reduce file size. Generalizing, the web page snapshots may be either uncompressed or compressed in any known image format (e.g., GIF, PNG, JPEG, TIFF, BMP, and the like). Images may be transmitted, stored, loaded in memory, and processed in different formats, as appropriate to the context.

The configuration of subsystem 316 may designate protected areas of snapshots that must always be considered dynamic pixels, as a form of censorship over certain information being included in a mirage image. The origin server 314 may be able to aid the subsystem 316 in identifying dynamic areas, in an on-demand way. For example, the subsystem 316 configuration may indicate that origin server 316 is capable of providing, for a given URL, a bitmap with dynamic areas removed or colored in a given color. This aids the subsystem 316 by indicating which areas should be removed during the image generation process. The configuration may indicate that origin 314 is capable of providing HTML with example data that, when rendered, will color any censorable areas in a particular color (e.g. bright red or #FF0000) either by images, CSS, or HTML, where the system 316 will simply render the image in farmed browsers and mark as dynamic any pixels that come up in that particular color. For example, origin 314 may emit '<p style="background: #ff0000">Hello, UserName.</p>' which would result in the area where that text is rendered being marked dynamic, along with some margin of pixels around it, and in conjunction with the other analysis. Instead of a color, the system 316 may allow semantic tagging such as a tag '<censor> . . . </censor>' which is transformed internally before rendering. These special responses from origin 314 may be prompted by an HTTP header (either a novel header key or value, or a certain User-Agent substring), URL parameter, or cookie value.

The subsystem 316 may employ Optical Character Recognition (OCR) to analyze snapshots to detect sensitive information. For example, OCR may be used to ensure that digits falling within certain lengths and patterns, such as those corresponding to a credit card number or fragment thereof, or U.S. Social Security number or fragment thereof. OCR may search for patterns directly or for introductory patterns that would precede sensitive information. Certain strings and patterns may be search for and elided. Additionally, system-wide strings and patterns for which to search may be coded into the system (e.g. "Account Settings", "My Account", "Shopping Cart", "Checkout", "Confidential", etc).

The subsystem 316 may employ graphical recognition of certain images to analyze snapshots for sensitive information or to designate the entire page as sensitive. For example, certain seals representing government bodies or certain certifications or memberships (such as safe ecommerce seals) may trigger treating all of the pixels on the snapshot as dynamic in order to avoid treatment on sensitive URLs.

In another embodiment, the system 300 can simply filter those URLs that will be used in the system. For example, URLs with cookies or URL parameters may simply not be harvested or used in the system, since they are more likely to have dynamic and personalized content.

Gating.

If the number or proportion of dynamic pixels is too high (per some configured threshold), or some step in the prior analysis has triggered a Boolean "do not proceed" flag, or the configuration indicates that this URL or a pattern to which this URL matches should not be treated, the system does not proceed with treatment on this URL (step 322). In order to avoid recalculating the decision frequently, this decision may be cached or otherwise stored. The decision may be stored permanently, cached for some time period (with a TTL), or cached for as long as the URL in question does not change (as determined by Last-Modified or ETag headers in a response), or a combination of whether the page has changed bounded by minimum and maximum time.

Sanitization.

At 324, if the number of dynamic pixels is below the threshold and otherwise acceptable for proceeding, the subsystem 316 builds reasonable bounding boxes around areas of dynamic pixels and paints over them in a determined background color, resulting in a "clean" image that preferably lacks anything based on advertising, personally identifiable information, dynamic content, the user's name, the time, the weather, stock markets, social media feeds, etc. This is the mirage image for that category. A category is typically represented by a set of client or content characteristics for which a given mirage image applies. A category may be, for example, defined by a combination of URL/client-browser-version/client-device-version/OS-version combination, some sub-combination thereof, or otherwise.

The background color used in sanitization may be global (same color used throughout the snapshot) or local (color is specific to the particular area of the snapshot). A global background color may be selected from the BGCOLOR attribute on the BODY tag in the HTML, the background-color assigned to the BODY tag in CSS, or a color code as configured for the web site in question, or as analyzed from image files used as background images on the web page, or the most common color from the snapshots obtained for the URL, or the most common color at the edges of the snapshots obtained for the URL. Additionally, the background color used for any particular bounding box may be set to be a background color unique to that area of the snapshot; while the area of pixels is determined to be dynamic, a single color may nevertheless dominate the bounding box area and that color can be set as the local background color.

Sprite Indexing.

At 326, the subsystem 316 compares the mirage image to individual image files referenced by the original HTML base document for the URL, and indexes the coordinates in the mirage image where the image bitmaps appear, if they do, along with some metadata about the original image files (size, last modified, etc.). Thus, in this embodiment, the mirage image can be used to represent not only as the image to use for the initial presentation to the client, but also (per the sprite index) contain a set of images needed for the actual page that will be loaded in the background.

Interaction Indexing.

At 328, in some embodiments, the subsystem 316 receives information from clients that relates to page navigation and control, in addition to the web page snapshot. The information may indicate clickable areas of the screen that yield a simple navigation with image maps, or controls such as pull-down menus, input boxes, and buttons that have no Javascript or relatively simple JavaScript evented to them. The subsystem 316 can evaluate this information and construct a set of metadata representing interactions that can be performed on the mirage image and this data can be transmitted along with the mirage image to facilitate fast navigation off the page or facilitate user interaction that can easily be replayed in the context of the full DOM once available.

Mirage Bundle Packaging.

At 330, as a result of the previous processes, which due to processing load are preferably performed in an offline, out-of-band system, a variety of mirage images have been prepared and indexed according to the appropriate category definition, e.g., URL+client device characteristics (browser, OS, make, model, etc.). Associated metadata may also be indexed too. This potential associated metadata typically includes data from the harvesting (the <title> tag or <head> block for the page), the sprite index created in the sprite indexing process 326, image map and controls created in the interaction indexing process 328. The mirage image and associated metadata is sometimes referred to below as a mirage bundle (although note that it is not required that the mirage image have any particular metadata, as this is not a limitation; the mirage images alone could be used if the extra functionality supported by the metadata is not desired) or interchangeably as a cheat bundle.

Placement on Content Servers, Network Repository, or Origin.

The prepared mirage bundles are made available to content servers 310 and/or network repository 312. In one implementation, the content servers 310 are intermediary proxy servers, such as shown and described with respect to FIG. 1. While the mirage bundles can be pre-populated on the servers 310, preferably they fetch the mirage bundles at the time (request-time) that they go forward for a corresponding original HTML base document from origin 314, and then cache the mirage bundle with a time to live (TTL). The TTL is potentially similar or equal to that for the HTML document. In the case of dynamic pages, a default TTL may be employed, derived either from configuration or a global default.

In another embodiment, the prepared mirage bundles are placed on network repositories 312 accessible to proxies at a given URL. In this alternative, the mirage bundles are obtained by proxies when needed. The dotted lines in FIG. 3 illustrates this alternative flow.

Transmission to Clients 308.

For a given client HTTP request on a given URL for a given HTML document, a given content server 310 transmits the corresponding mirage image to be displayed on the client screen as soon as possible, along with the rest of the mirage bundle. The mirage image is preferably wrapped in an HTML referencing the mirage image. A specific example of such wrapping HTML will be described later with respect to FIG. 5. Preferably the mirage image corresponds to the browser/OS/make/model/etc. making the request (i.e., the mirage image was developed from snapshots on the same client device), but some fuzzy matching may be employed to reduce the number of mirage image versions in the system 300.

As mentioned previously, virtually any client compatible format could be used for the image; gzipped PNG, JPG, GIF or the like are typical formats used on the web. The HTTP request-response message exchange is preferably a conventional sequence, with the mirage image being returned, preferably with the container HTML wrapping the embedded mirage image reference as mentioned. Some metadata about the page may be desirable to send ahead of the mirage image, so that the client 308 can use it ahead of time. Examples of such metadata include the <title> tag contents.

A variety of delivery approaches are possible. As an example, the order of transmission for HTTP 1.0 or 1.1 could be: the HTML document where the mirage image has been referenced (or directly inserted) into the HTML document using HTML tags or JavaScript such that it does not require special understanding to render on the client. (This approach reduces or eliminates the need for a custom-programmed client to be able to consume the mirage image.) In other embodiments, particularly where a custom client 308 is used, the order of transmission can be: (a) mirage image followed by the HTML document, (b) some key metadata extracted from the HTML, followed by the mirage image, followed by the HTML document, and (c) the HTML <head> section in full followed by the mirage image followed by the HTML document, or For HTTP 2.0, the order may be any of those mentioned for HTTP 1.0 or 1.1, as well as (d) the content server 310 emits a PUSH_PROMISE frame for the mirage image using a slightly modified URL, and prioritizes it highest so that it gets transmitted before the HTML document, with the HTTP/2 client 308 knowing what to do with it, or (e) the same as (d) but the mirage image is referenced into the HTML document, and by being pushed first has necessarily already arrived by the time the HTML document is rendered, making immediate render likely. The mirage image may be sent as two images, one for above the fold and one for some portion below the fold, to facilitate faster rendering of the one above. If an image map of simple anchors was saved and processed, then it may also be transmitted, and the painted mirage image may be instrumented with the same simple anchors to facilitate some of the possible clicks/touches.

In any of the foregoing approaches, the content server 310 may provide a URL reference (e.g., pointing to the aforementioned network repository) for the mirage image and associated metadata rather than the item itself.

Note that in some embodiments, a client visiting a URL for the second or subsequent time, having already been sent a mirage image, could be sent "diff" information based on the prior mirage image to create the current mirage image.

Event Capture.

Preferably, a mechanism is provided in the client 308 (natively, or instrumented in JavaScript injected in the HTML that wraps the mirage image, or otherwise) to capture click/touch/gesture or other user-interface events that occur before the document object model (DOM) is loaded. These events are transferred over to the DOM once live. For example, click/touch events can be saved and replayed once the DOM is live. Pinch-and-zoom and other multi-touch events can either be recorded and replayed or discarded, or can cause some user interface artifact to indicate to the user that the page is not yet ready to receive such complex gestures. Scroll events may not need to be captured as the mirage image may be longer than the screen height and thus, e.g., scrolling may be executed on the mirage image.

Note that if an image map of simple anchors is available, and transmitted to the client 308, the receipt of a click/touch on the image may point the browser away to another page, meaning that the actual page may not ever load. Similarly, in certain embodiments, basic form controls such as pull-down menus, input boxes, and buttons are rendered over the mirage image and are operable, allowing the user to alter their values. They may be evented with JavaScript, and this Javascript may trigger a navigation event that points the client browser away to another page, meaning that the actual page may not ever load. Controls may be displayed and operable simply to capture value changes and replay them later, similar to clicks, touches, and gestures; for example, key presses in a text input box may be captured for later replay, with or without allowing the key presses to affect the mirage image.

User Interface Waiting State.

Particularly in embodiments where the client device 308 has been custom programmed to interact with the system 300, the mirage image may be displayed in the typical fashion the client browser, or alternatively, be grayed out or displayed with a spinner, or otherwise with artifacts indicating to the user that it is not live yet. The particular user interface treatment may be defined by content provider input and configuration or by particular client device manufacturer, or network operator leveraging the system 300.

Load of Actual Page.

The page load continues normally immediately after the mirage image arrives. The HTML for the actual page arrives and the DOM is built off-screen, under the mirage image, using a pre-render function for example. Modern browsers have the capability to preload and pre-render in an unseen tab. A JavaScript approach may be utilized in the absence of such functionality. Note that the HTML and page objects can be requested (HTTP Get) by the client device in the conventional manner on the basis of links inserted into the HTML that was sent to wrap the mirage image.

De-Spriting.

For embodiments that utilize the sprite indexing option, the content server 310 transmits image files for the actual page to the client, except images which are sprites and can be extracted out of the mirage image, which are known to the content server from offline analysis. Hence, if the content server receives a browser request for an image that is known by the content server to be within the mirage image, the content server sends the client four integers to serve as the coordinates, as well as some of the original metadata regarding the image file (size, last modified, etc.) and the client uses this information to extract the proper sprite out of the mirage image. The server may utilize a particular value for the Content-Encoding or Transfer-Encoding HTTP header to signal that the browser should expect this type of response, or it may use some other HTTP header, or a special value preceding the integers. The browser cache may be updated to include a placeholder for the image file. Note that the original image file, as encoded (as GIF or PNG etc.) is not actually sent from the content server, so it may be preferable not to save into browser cache.

In cases where HTTP/2.0 is being employed, the content server 310 may use PUSH_PROMISE to inform the client browser that a sprited image will be transmitted.

Switch.

After the DOM is ready on the client, the user display is transitioned as seamlessly as possible from the initial page with the mirage image to the actual page, preferably such that the change is invisible. A display transition is also possible—e.g. fading in over the mirage image over one second, sliding in from the bottom, growing from a point in the middle of the screen to take up all the space, or otherwise. A display transition may be specified in a configuration or defaulted to a system wide approach.

A variety of mechanisms may be used to first display the page with the mirage image, and then switch the view to the actual page. The teachings hereof are not limited to the use of a particular mechanism. Note that the system 300 may address several types of browsers and employ a different technique for each, selecting the particular mechanism at response time. Several examples are provided below.

One option is for a browser to display the mirage image full-screen and perform the event capture as described elsewhere herein. The switch may be facilitated by one of the following methods, for example. Many of the methods involve use of the wrapping HTML for an initial splash page, which loads the mirage image and provides logic to load the actual HTML for the actual page.

(i) The mirage image is arranged into the actual page HTML such that it appears logically above other content in visual terms (using CSS z-index and absolute positioning) and is mentioned first in the document, possibly with inline data: URI encoding. Javascript evented to the onload event can remove it.

(ii) The actual page is loaded within an IFRAME on the initial page, to be revealed upon load by removing the mirage image or rearranging the DOM such that the DOM nodes of the actual page take over the whole page.

(iii) The initial page utilizes a discrete pre-render function in the browser, such as the pre-render API offered by Google Inc.'s Chrome browser or the Chromium open source browser upon which it is based, or the pre-render functionality offered in Microsoft Corporation's Internet Explorer. To accomplish this, for example, an instruction can be added to the <head> of the initial page to initiate the pre-rendering of the actual page ('<link rel="prerender" href="http://example.org/index.html?mirage">'). (The URL may require an additional parameter in order to distinguish itself from the initial page and trigger action, or the initial page may have had an altered URL by virtue of a preceding HTTP 302 redirect in response to the original request, in which case the real URL may now be mentioned.) The point in time at which to switch in the pre-rendered page can be done in different ways. If the browser supports API calls to check upon the status of a pre-rendered URL, those calls may be used by the initial page, and a navigation event may be engaged when the actual page is ready, thus triggering the display of the actual page. In the event that the API for the pre-render function does not allow the initial page to check on the pre-render status of the actual page, there are nevertheless other techniques that can be used. For example, a timer may be used on the splash page to switch to the actual page after an elapsed time, where the time selected is based upon the time it took to load the actual page in the farm or cooperating client pool, or based on aggregate Navigation Timing data beaconed back from the actual page into a central data repository accessible directly or indirectly to the system creating the initial page.

(iv) In another embodiment, the approach can involve using the server to echo a ready message from a preload environment (e.g., a hidden tab) to the initial page such that the initial page knows to remove itself. More specifically, the initial page may utilize a long-polling method with the server, or Server Side Events, or WebSocket, or a PUSH_PROMISE frame in HTTP/2, in order to hold open a connection with the server and receive a "ready" message when the actual page is loaded. In this case, the actual page is modified by the system to include code that generates an AJAX call evented to occur upon the onload event (or a similar event), or to open a WebSocket and send a message to the server. The purpose is to notify the server of page load or a similar event, which the server acknowledges and then reacts by immediately notifying the initial page by sending the ready message previously mentioned, which in the case of an HTTP long-poll request, may simply be an HTTP 200 in response to a recognized request. This technique may also employ a token, passed by the initial page to the actual page by URL, in a URL parameter or in the URL fragment, which may be passed from the actual page to the server and back again from the server to the splash page, in order to provide some level of assurance/authenticity checking.

(v) In another embodiment, to avoid the prospect of network communication to a server, a Shared Web Worker may be employed by the initial page, which if permitted by the browser allows communication between the splash page and the actual page. The actual page is modified by the system—as it passes through the proxy, for example—to include code to utilize the Shared Web Worker. The communication between the pages allows the actual page to communicate when it has finished loading by eventing code to the onload event or a similar event.

(vi) As another embodiment, which also avoids network communication to the server, a WebRTC connection may be made by the client browser to itself, allowing communication between the initial page and the actual page. The actual page is modified by the system to include code to utilize WebRTC and connect to code on the initial page which utilizes WebRTC. Communication between the pages allows the actual page to communicate when it has finished loading by eventing code to the onload event or a similar event. Refiring. After the actual page loads, events captured earlier are re-fired on the live DOM, such that an end-user is not inconvenienced for having seen the mirage image. Event firing may be done strictly honoring the events captured, or certain redundant events may be skipped, for example scrolling down and then scrolling back up might be suppressed as the actions cancel each other in terms of where the display lands (back at the top). Once the actual page is on the screen and captured events have been refired, the user can browse as normal.

Figure 4:
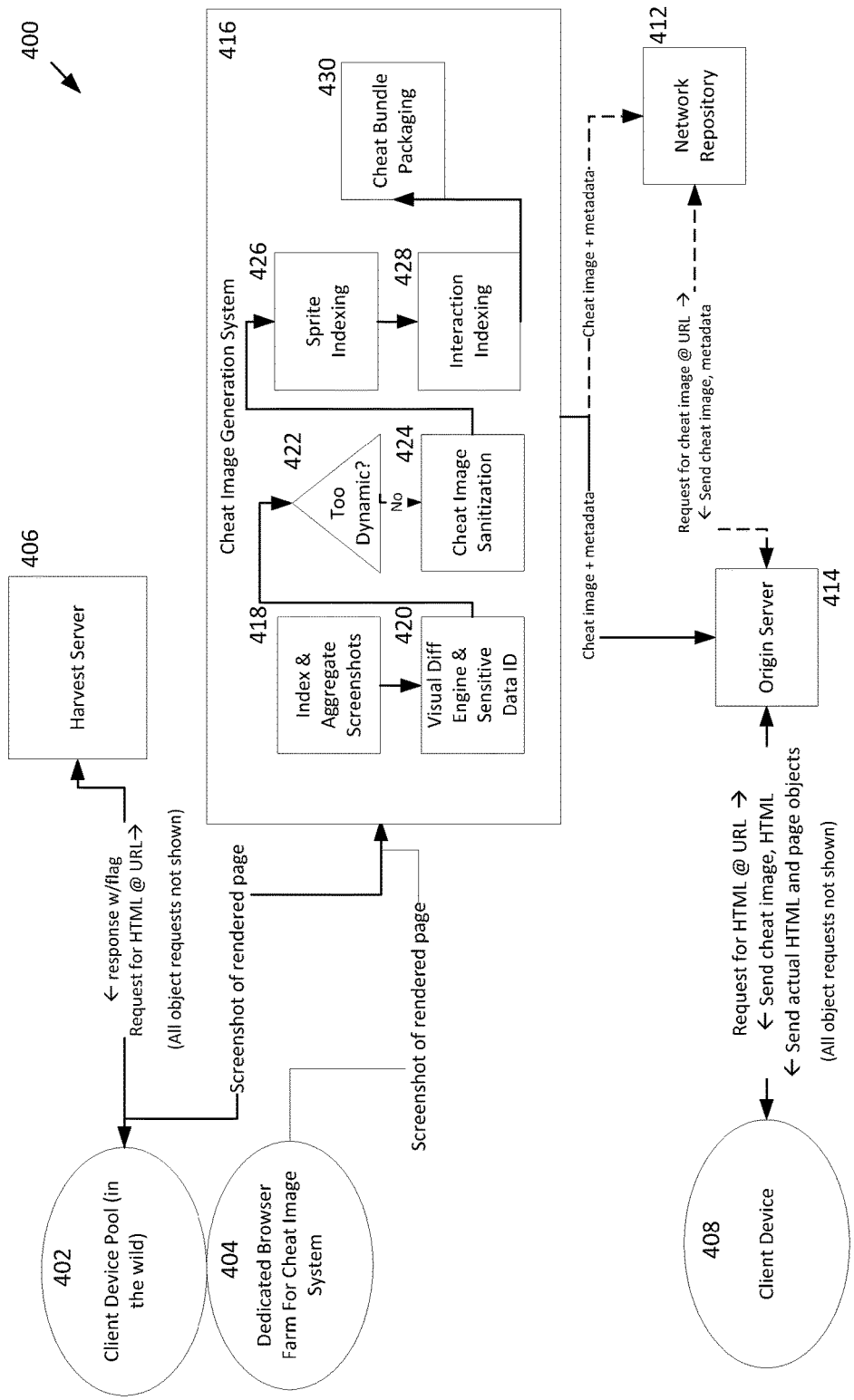
FIG. 4 is a schematic diagram illustrating an embodiment of a content delivery system that creates and delivers web page snapshots, in accordance with the teachings hereof.

FIG. 4 illustrates an alternative system embodiment. Most aspects of the system 400 parallel that of system 300 described with respect to FIG. 3; however, in this embodiment, the origin server 414 interacts directly with client devices 408, rather than through content server 310 as was shown in FIG. 3. Mirage image generation subsystem 416 can transmit the processed mirage images and/or bundles directly to the origin server 414. From there, the origin server 414 can respond to client requests directly, providing the mirage image and wrapper HTML and then the actual page components, as was described above in connection with FIG. 3. The subsystem 416 can also place the processed mirage images and/or bundles on a network repository 412 form which the origin server can fetch them when needed.

Figure 5:
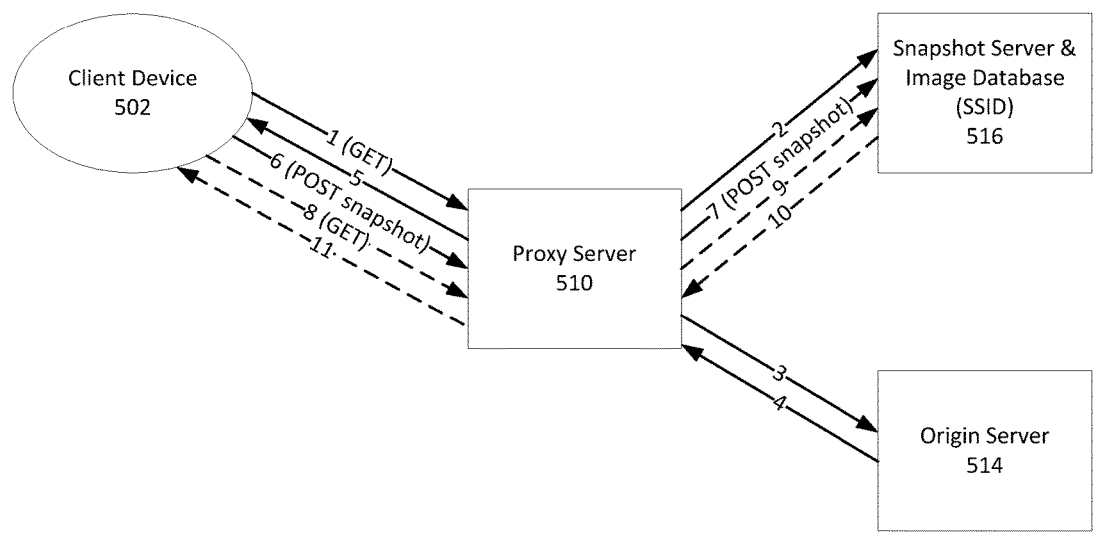
FIG. 5 is a schematic diagram illustrating an embodiment of a content delivery system that creates and delivers web page snapshots, in accordance with the teachings hereof.

FIG. 5 illustrates another system embodiment. In FIG. 5, a client device 502 requests content from a proxy server 510. The proxy server 510 interacts with a snapshot server and image database (SSID) 516 and an origin server 514 that is typically associated with a content provider. The proxy server is in this embodiment a CDN server 102 of the type described earlier, and is preferably deployed at a network edge. Client requests are directed to the proxy server 510 preferably using DNS aliasing, redirection, Anycast, via client configuration, or other technique. The SSID 516 performs many of the functions described earlier with respect to system 316/416 in FIGS. 3-4. The SSID 516 is preferably a server which manages a database of snapshots captured and contributed by clients.

The proxy server 510 handles client requests, injects JavaScript snippets in the web pages to capture snapshots, and forwards client posts of the snapshots to the SSID server. With reference to FIG. 5, the workflow generally proceeds as follows. At 1, the proxy server 510 receives a request (e.g. an HTTP Get request specifying a hostname associated with the content provider of the origin server and a URL for a given HTML document) from the client device 502. At 2, the proxy server 510 queries the SSID 516 using the requested URL before forwarding the request to origin 514. If a mirage image for the requested web page is available, then the SSID 516 returns the mirage image of the requested web page with the HTML document wrapping the mirage image. If it is not available, the SSID 516 responds with a 404 HTTP response code. In this example, assume a 404 response is received, because no snapshot/mirage image is available for the requested page yet. (The 404 is not illustrated in FIG. 5.) In this case, at step 3 the proxy server 510 issues a forward request to origin 514 to retrieve the HTML for the page. The proxy server injects a client hook into the HTML for the web page that is received at step 4, which will be explained in more detail below, and returns the modified HTML to the client at step 5. The client hook will cause the client to provide a snapshot of the page.

While in some embodiments the origin could provide HTML that already contains a client hook in another embodiment, the origin server 514 is insulated from having to make changes to web pages. Thus in such an embodiment the proxy server 510 injects JavaScript code into the HTML served by origin. As mentioned, the JavaScript code in the client hook is responsible for causing the client device 502 to take a snapshot of the rendered web page and POSTing it back to the origin hostname (which will be handled by the proxy server 510). By having the POST operation go back to the same hostname, this operation honors the same origin policy in the client browser. The POST action from client devices is preferably performed after the web page finishes loading so that the loading of the page is not affected. Where the client device 502 is a mobile device, the POST can be programmed to happen only when mobile device is on a Wifi network and not a cellular network, so that it doesn't use the expensive resource of the cellular connection and/or eat up bytes in the end user's data plan. Also, the proxy server 510 may determine not to include the POST instruction if the system already has a snapshot (or a suitable number of snapshots) of the particular URL at hand.

The web page snapshot capture can be implemented, for example, using the html2canvas JavaScript library. An example of a client hook in JavaScript is shown below, although those skilled in the art will appreciate that this is merely one implementation and that JavaScript is not required.

```
<script type="text/javascript"
src="http://proxy-server.com/html2canvas.js">
</script>
<script type="text/javascript">
var appendit = function( )
{
html2canvas(document.body, {onrendered: function(canvas) {
    //document.body.appendChild(canvas);
    var image = canvas.toDataURL("image/png");
    var formData = new FormData( );
    formData.append('mirage',image);
    formData.append('murl',document.URL);
    console.log(document.URL);
    var xhr = new XMLHttpRequest( );
    xhr.addEventListener('load', function ( ) {
    console.log('uploaded!');});
    xhr.open('POST', "/mirages", true);
    xhr.send(formData);}});}}
</script>
<script>
onload = appendit;
</script>
```

At step 6 in FIG. 5, a client device 502 can post a web page snapshot by implementing an HTTP POST in accordance with the injected JavaScript. In this implementation, there are four parts to the client's post:

Snapshot: A snapshot of the web page in a lossless PNG format encoding, the snapshot size being twice the size of the viewport on the client device. The usage of PNG is preferred to facilitate the pixel wise comparison in the desensitization process. The data size of the uploaded snapshot is preferably limited by only capturing and sending snapshots with a maximum height of twice the viewport on the client device.

URL: A URL of the web page to which the posted snapshot pertains.

Links: A set of 5-tuples containing hyperlinks on the rendered web page with coordinates in the form of {URL, left, top, right, bottom} used for generating a click map which will be overlaid on the snapshot in the wrapper HTML. Preferably the client browser traverses the DOM tree when creating the snapshot and finds the href coordinates to upload.

Viewport height: Size of the viewport on the client device when the snapshot was taken. This is used by the SSID 516 to limit the number of links overlaid on the snapshot and also to determine the snapshot size for a particular device type.

The proxy server 510 transmits the POST to the SSID 516 at step 7. The SSID 516 stores the posted snapshots and generates a time stamped name that indicates the requested URL, along with the request of the information in the post in a separate file. The requested URL is used to correlate snapshots pertaining to the same web page for the processing of snapshots, described below.

The processing of snapshots may be performed as described earlier with reference to FIGS. 3-4 (blocks 316, 416). For example, after the snapshot is stored on the SSID 516, the snapshots can be processed to desensitize them of user-specific private information, and to remove ads, or other dynamic content. The desensitizing involves pixel wise comparison of multiple snapshots for the same URL to create a mask which is then overlaid on the original snapshots. This ensures that the areas containing sensitive information are blanked out in the served snapshots, see FIGS. 4A-4B. As before, this is designed to happen offline in the SSID 516 because image analysis is heavy and may take some considerable amount of time varying from a few seconds to a few minutes to complete. In an embodiment, Mirage HTML is not available for servicing clients till a pre-defined number of web page snapshots have been received by the server. Three snapshots can be used but this can be increased based on individual websites and degree of sensitive information on the web page. It is also possible to use sensitive text removal based on OCR to either not store snapshots of sensitive web pages or remove sensitive information wherever possible. The processed mirage image and metadata—which contains the links and their co-ordinates of the web page—are used to generate a wrapper HTML, which is used to serve clients as discussed below.

Typically, a single image is created for the web page for a given client device or class of similar client devices. The image is associated with a wrapper HTML, in the manner described previously with respect to FIGS. 3-4. Preferably, in addition to the link to the mirage image, the wrapper HTML contains a hint (pre-render link) to the original (actual) URL and a code to swap the mirage image with the actual web when the prerendering process is completed. Pre-rendering in this embodiment relies on a web browser's capability to load a web page in the background, which is available in modern browsers such as Chrome.

An example of wrapper HTML is provided below. The term "mirage" refers to the evocative internal project name for the technology described herein:

```
<html><head>
<title><requested URL></title>
<script type="text/javascript">
var onPrerenderLoad = function( ){
// Prerender finished => redirect to
// requested URL>;}
var setup = function( ){
// install pre-render event listeners
link.addListener('webkitprerenderdomcontentloaded'
,onPrerenderDomLoaded , false);
</script>
// pre-render link
<link id=mirage rel="prerender"
href="<Requested URL>/?mirage-prerender">
<script>setup( );</script>
</head><body>
//Link to mirage snapshot
<img src= "mirages/<snapshot>" usemap="#miragecmap">
// Clickable image map overlaid on snapshot
<map name="miragecmap">
<area shape="rect" coords="0,0,0,0" href="link-1">
<area shape="rect" coords="603,10,624,27" link-2">
<area shape="rect" coords="720,50,670,27" link-3">
.
.
</map></body></html>
```

Referring back to FIG. 5, assume the wrapper HTML with processed snapshot (mirage image) has been stored at the SSID 516, and that the client device 502 makes a subsequent request for the web page (step 8). The proxy server 510 goes forward (step 9) to the SSID 516 to retrieve the wrapper HTML and mirage image for the requested URL, and in this case, the SSID 516 has the mirage image, so it returns it to the proxy server 516 (step 10), which returns it to the client device at 11.

The client device 502 executes the above wrapper HTML and will request the mirage image from the proxy server 510. Clickable links are overlaid over web page image using the "imagemap" tag and the stored co-ordinates from the snapshot POST. Further, client device executes the pre-render directive and requests the actual web page to load in the background. The proxy server 510 will be able to distinguish this "pre-render" request from other requests because of the unique identifier appended to the URL "?mirage-prerender". Seeing this, the proxy server 510 retrieves the HTML for the actual page from cache or from the origin server 514 and returns it to the client device 502, omitting the unique identifier when making the forward request. This is but one implementation; for example, in other embodiments a unique pattern other limitations, a unique pattern could be placed in the HTML comment or a cookie approach could be used (e.g., add mirage cookie in mirage HTML that contains the pre-render request).

Note that foregoing workflow has assumed that the proxy server 510 does not have valid (e.g., unexpired) objects in cache. However, in operation, the proxy server 510 might have the certain objects in cache, be they the origin server's HTML for the web page, and/or the wrapping HTML and mirage image. In such cases, the objects can be served from cache, or revalidated if the TTL is expired, in accordance with conventional proxy caching operations.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

FIG. 6 is a block diagram that illustrates hardware in a computer system 600 on which embodiments of the invention may be implemented. The computer system 600 may be embodied in a client device, server, personal computer, workstation, tablet computer, wireless device, mobile device, network device, router, hub, gateway, or other device.

Computer system 600 includes a microprocessor 604 coupled to bus 601. In some systems, multiple microprocessor and/or microprocessor cores may be employed. Computer system 600 further includes a main memory 610, such as a random access memory (RAM) or other storage device, coupled to the bus 601 for storing information and instructions to be executed by microprocessor 604. A read only memory (ROM) 608 is coupled to the bus 601 for storing information and instructions for microprocessor 604. As another form of memory, a non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

Although the computer system 600 is often managed remotely via a communication interface 616, for local administration purposes the system 600 may have a peripheral interface 612 communicatively couples computer system 600 to a user display 614 that displays the output of software executing on the computer system, and an input device 615 (e.g., a keyboard, mouse, trackpad, touchscreen) that communicates user input and instructions to the computer system 600. The peripheral interface 612 may include interface circuitry and logic for local buses such as Universal Serial Bus (USB) or other communication links.

Computer system 600 is coupled to a communication interface 616 that provides a link between the system bus 601 and an external communication link. The communication interface 616 provides a network link 618. The communication interface 616 may represent an Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the microprocessor executing program code. Such code may be read from or stored on a non-transitory computer-readable medium, such as memory 610, ROM 608, or storage device 606. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 618 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

Additional Examples

An additional example of a web page snapshot POST (step 6, FIG. 5) is shown below:

---

Remote Address:12.34.56.78:8080
Request URL: http://<Akamai Mirage Server>/mirages
Request Method: POST
Status Code: 200 OK
Request Headers
    Accept:*/*
    Accept-Encoding:gzip,deflate,sdch
    Accept-Language:en-US,en;q=0.8,de;q=0.6
    Connection:keep-alive
    Content-Length:230806
    Content-Type:multipart/form-data; boundary=----WebKitFormBoundaryF42AdXDIXmC6z9Ds
    Host: <Akamai Mirage Server>
    Origin: <Akamai Mirage Server>
    Referer: <Akamai Mirage Server>/www.nytimes.html
    User-Agent:Mozilla/5.0 (Macintosh; Intel Mac OS X 10_9_3)
AppleWebKit/537.36 (KHTML, like Gecko) Chrome/35.0.1916.114 Safari/537.36
    Request Payload
        ------WebKitFormBoundaryF42AdXDIXmC6z9Ds
        Content-Disposition: form-data; name="mirage"
        data:image/png;base64, ,<base 64 encoded image of webpage's snapshot e.g.,>
        iVBORw0KGgoAAAANSUhEUgAABpAAAAGVCAYAAAD5SbL8AAA
gAElEQVR4XuydB5hV1dWGGv9vv9v9ArQAREQAREQAREQARE
QAREQAREQAREQAREQAREFonsC/Ac3DBfGuDp95AAAAAEIF
TkSuQmCC
        ------WebKitFormBoundaryF42AdXDIXmC6z9Ds
        Content-Disposition: form-data; name="murl"
        http://www.example.com/
        ------WebKitFormBoundaryF42AdXDIXmC6z9Ds-- Content-Disposition: form-data; name="mmap"
        http://subdomain.example.com/content/help/site/ie8-support.html,0,0,0, http://www.example.com/foobar/index.html, 969,131,1093,143, <list of all the links and corresponding coordinates>/
        ------WebKitFormBoundaryF42AdXDIXmC6z9Ds
        Content-Disposition: form-data; name="vheight"
        1176 <2* size of client device's viewport>
        ------WebKitFormBoundaryF42AdXDIXmC6z9Ds--
Response Headers
    Date: Mon, 16 Jun 2002 20:59:43 GMT
    Server: BaseHTTP/0.3 Python/2.7.3

---

An example of a GET request for wrapper HTML with processed snapshot/mirage image (step 9, FIG. 5) to the SSID server 516 is shown below:

Remote Address: 12.34.56.78:8080
Request URL: http://<SSID-Server>/www.example.com/
Request Method: GET
Request Headers
Accept: text/html,application/xhtml+xml,application/xml; q=0.9
Accept-Encoding: gzip,deflate,sdch
Accept-Language: en-US,en;q=0.8,de;q=0.6
Connection: keep-alive
Host: <SSID-Server>
User-Agent: Mozilla/5.0 (Macintosh; Intel Mac OS X 10_9_3)
AppleWebKit/537.36 (KHTML, like Gecko) Chrome/35.0.1916.114 Safari/537.36

The invention claimed is:

1. A method for generating pre-rendered web pages in a computing platform for delivery to client devices, comprising:

receiving, from a first client device, a first image of at least a portion of a particular web page rendered by the first client device, the particular web page being associated with a markup language document;

receiving, from a second client device, a second image of at least a portion of the particular web page rendered by the second client device;

aggregating at least the first and second images into a set;

analyzing the set to determine image areas that are common and image areas that differ across images in the set;

generating a third image from the set, the third image retaining at least some of the image areas that are common and omitting at least some of the image areas that differ, if any;

receiving a request for the markup language document from a third client device;

sending the third image to the third client device, after receipt of the request.

2. The method of claim 1, further comprising analyzing the first image to determine if it contains sensitive information.

3. The method of claim 2, wherein the analysis comprises optical character recognition.

4. The method of claim 1, wherein aggregating at least the first and second images into the set includes selecting the first and second images for the set according to one or more common characteristics of the first and second client devices, the one or more common characteristics including any of: a browser type, an operating system type, a screen size, a device model.

5. The method of claim 1, wherein said analysis of the set comprises a pixel wise comparison.

6. The method of claim 1, further comprising sending an image map with the third image for capturing user-interface events.

7. A system for generation and delivery of pre-rendered web pages to client devices, comprising:
  a first server comprising a microprocessor and memory holding program instructions that when executed cause the first server to:
  receive from a first client device a first image of at least a portion of a particular web page rendered by the first client device, the particular web page being associated with an markup language document;
  receive from a second client device, a second image of at least a portion of the particular web page rendered by the second client device;
  send the first image and the second image to a second server;
  the second server comprising a microprocessor and memory holding program instructions that when executed cause the second server to:
  aggregate at least the first and second images into a set;
  analyze the set to determine image areas that are common and image areas that differ across images in the set;
  generate a third image from the set, the third image retaining at least some of the image areas that are common and omitting at least some of the image areas that differ, if any;
  the first server further holding program instructions that when executed cause the first server to:
  receive a request for the markup language document from a third client device;
  send the third image to the third client device, after receipt of the request.

8. The system of claim 7, wherein the first server retrieves the markup language document from an origin server and sends it to the first client device, prior to receiving the first image.

9. The system of claim 7, wherein the first and second servers are servers in a content delivery network.

10. The system of claim 7, the second server further holding program instructions that when executed cause the first server to: analyze the first image to determine if it contains sensitive information.

11. The system of claim 10, wherein the analysis comprises optical character recognition.

12. The system of claim 7, wherein aggregating at least the first and second images into the set with the second server includes selecting the first and second images for the set according to one or more common characteristics of the first and second client devices, the one or more common characteristics including any of: a browser type, an operating system type, a screen size, a device model.

13. The system of claim 7, wherein said analysis of the set comprises a pixel wise comparison.

14. The system of claim 7, the first server further holding program instructions that when executed cause the first server to: send an image map with the third image for capturing user-interface events.

* * * * *